May 21, 1940.  W. F. JACKSON  2,201,399
FUEL CONTROL DEVICE
Filed Jan. 7, 1938  3 Sheets-Sheet 1
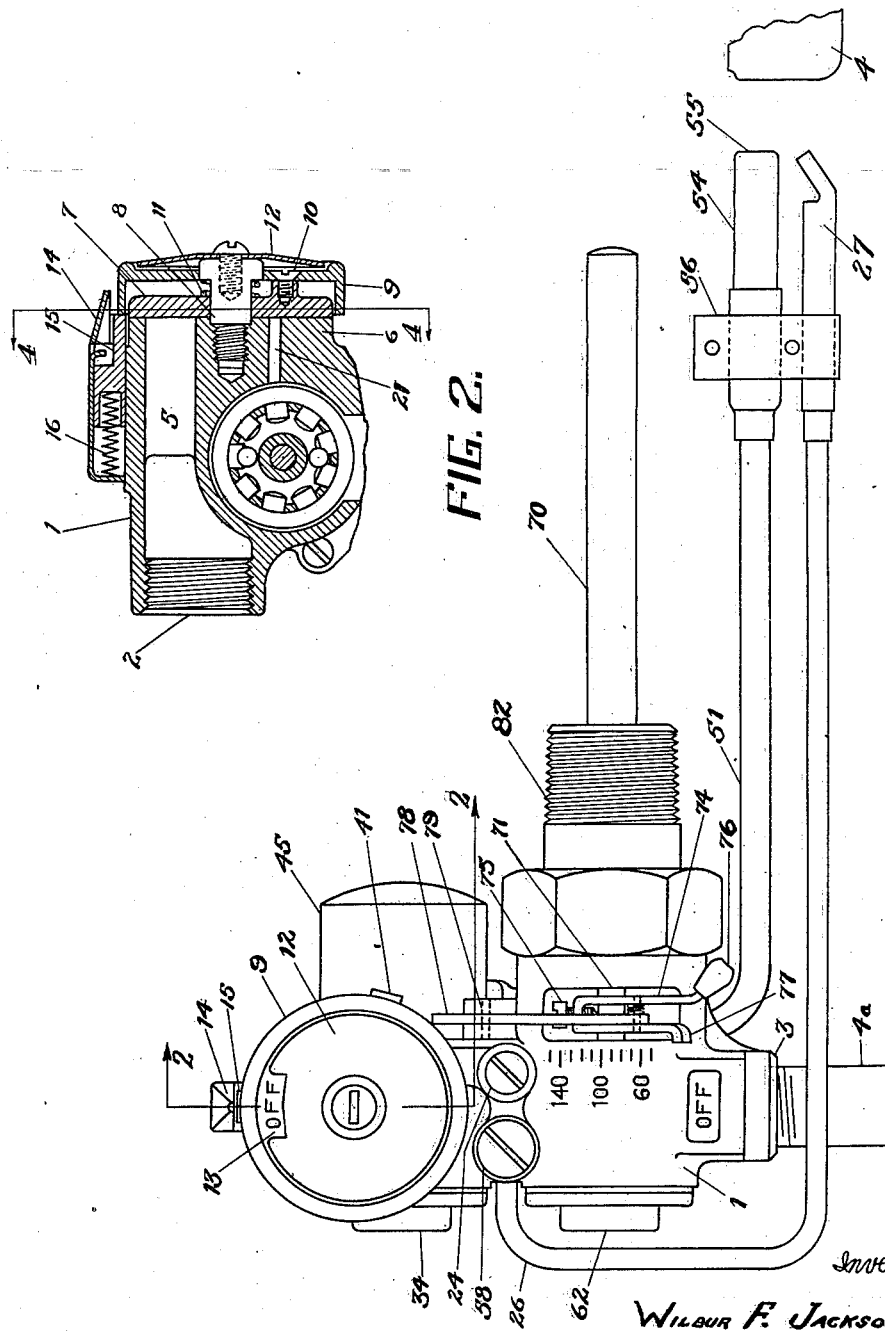
Inventor
WILBUR F. JACKSON.
By:- John R. Shipman
attorney.

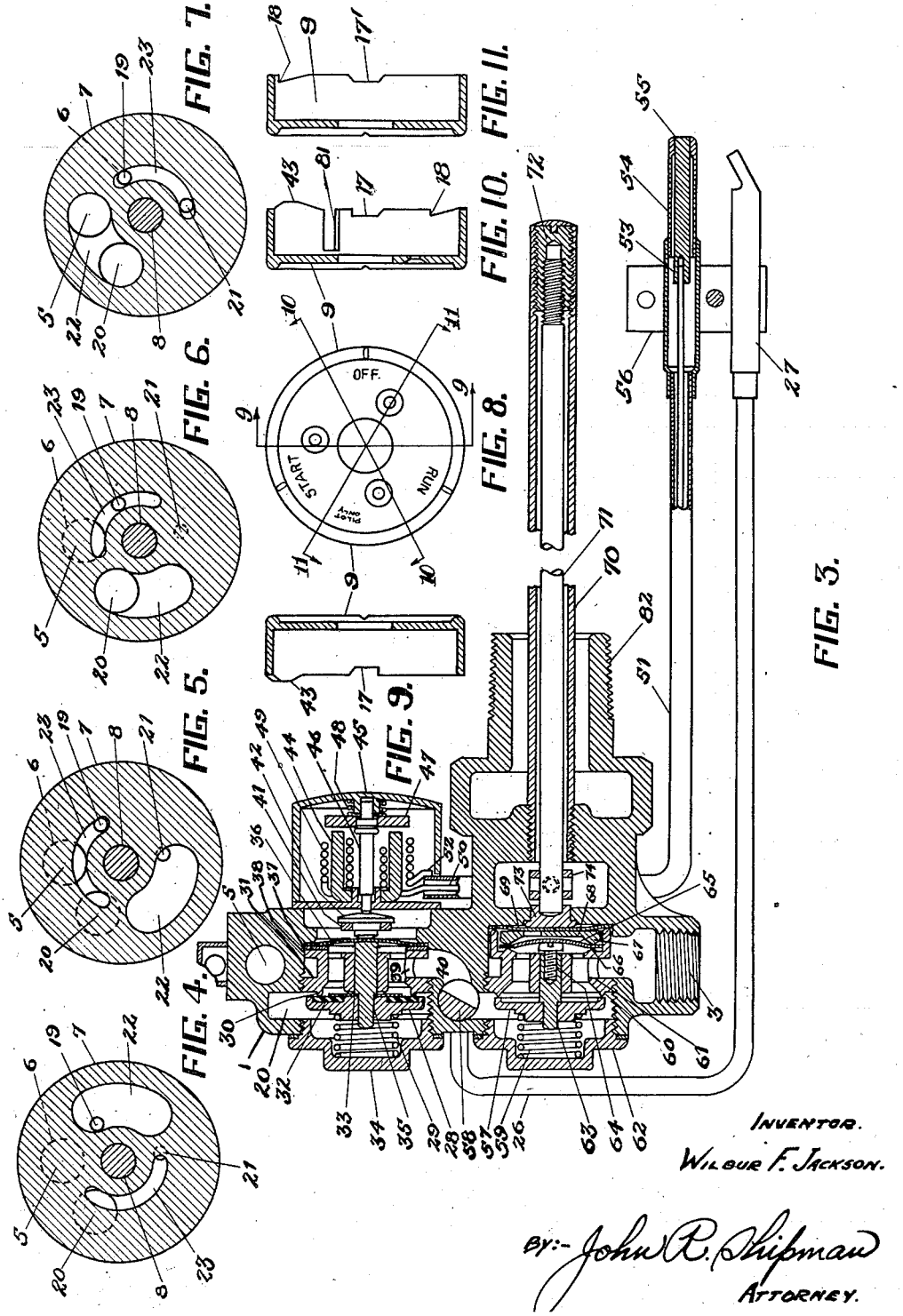

May 21, 1940.	W. F. JACKSON	2,201,399
FUEL CONTROL DEVICE
Filed Jan. 7, 1938	3 Sheets-Sheet 3

INVENTOR
WILBUR F. JACKSON.

BY:- John R. Shipman
ATTORNEY.

Patented May 21, 1940

2,201,399

UNITED STATES PATENT OFFICE 2,201,399

FUEL CONTROL DEVICE

Wilbur F. Jackson, Compton, Calif., assignor to Grayson Heat Control, Limited, Lynwood, Calif., a corporation of California

REISSUED
JUL 4- 1944

Application January 7, 1938, Serial No. 183,811

9 Claims. (Cl. 236—21)

This invention relates generally to fuel control devices and more particularly to combination controls for gas appliances.

The primary object of the present invention is to provide a combination control including a shut-off cock, a safety pilot valve and a thermostatic regulating valve which will be completely safe at all times.

There are a few alleged completely safe combination controls on the market. However, all of those with which I am acquainted, have what is known as an open spot. That is, at some point in the procedure necessary to light the appliance, the valves may all be in open position with the safety pilot valve being held open. If the pilot flame should be extinguished at this time, the natural thing for an inexperienced operator to do is to try to relight the pilot. A delay in finding and striking a match would allow sufficient gas to flow through the open valves to cause an explosion. A purpose of the present invention is to provide a control in which the thermostatic valve for regulating the flow of fuel to the main burner is locked in a closed position until the shut-off cock is fully open, the safety valve set and the pilot burning.

It is still a further object to provide a combination control in which the shut-off cock, safety valve and regulating valve are so arranged as to require the operator to follow the correct procedure in lighting the appliance.

Another object is the provision of a control device in which a lever interconnects the handle of the cock and the adjusting means of the thermostatic valve to prevent the adjusting means from being moved above a setting which is sufficiently low to preclude opening of the valve, means being provided to avoid such interconnection only when the cock has been turned to its final running position.

The provision of a combination control which is compact as well as reliable and which includes various features of construction facilitating low cost manufacture and insuring ease of operation is another object accomplished by the present invention.

The manner in which the foregoing objects are accomplished and additional advantageous features will become apparent as the description of the structure progresses. For purposes of illustration only, the device is shown in the drawings and will be hereinafter described as adapted for use with a gas burning domestic water heater.

Referring to the drawings:

Fig. 1 is a side elevation of the control;

Fig. 2 is a fragmentary sectional view along the line 2—2 of Fig. 1;

Fig. 3 is a side sectional view of the device;

Figs. 4, 5, 6 and 7 are partial views in section along line 4—4 of Fig. 2 showing the relative positions of the passages in the rotor and stator at "off", "start", "pilot only" and "run" positions, respectively;

Fig. 8 is an elevation of the dial;

Figure 12:
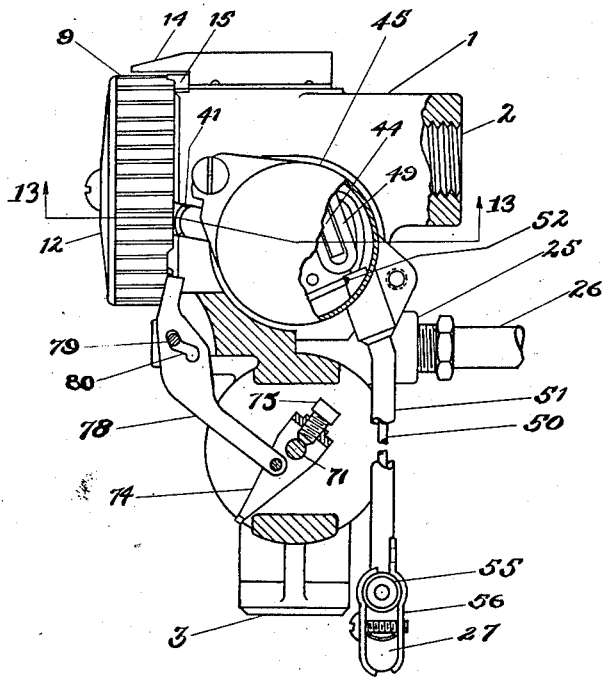

Figs. 9, 10 and 11 are sections along lines 9—9, 10—10 and 11—11, respectively, of Fig. 8;

Fig. 12 is a partially sectional end view of the device; and

Figure 13:
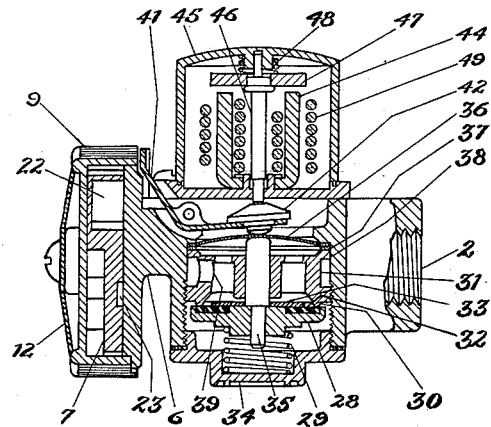

Fig. 13 is a sectional view along line 13—13 of Fig. 12.

As shown in the drawings, the controls are housed in a casing 1 having an inlet 2 and an outlet 3 connected to supply gas to a main burner 4 through pipe 4a. Gas entering inlet 2 proceeds through passage 5 to a rotor disk type of gas cock including a stator 6 formed in the casing and a rotor disk 7. The stator has a smooth, accurately finished, flat seat intercepting the main conduit through the casing, of which passage 5 is a part, and having a central, threaded hole therein. The rotor disk has a similarly finished face engaging the seat with a central opening therethrough. A stem 8, having a head on one end, threads on the other end and a machined portion intermediate the ends, extends through the central opening in the rotor with the threaded end tightly mounted in the hole in the stator and the machined portion serving as an axle for the disk.

A cup-shaped dial, operating handle or knob 9 fits over and around the disk and is secured thereto by screws 10. The dial 9 has a central opening through which the head of stem 8 extends. The face of the disk 7 is held tightly against the stator seat by a spring 11 between the head of the stem and the rotor. The front face of dial 9 carries indicia and a plate 12 secured to the head of stem 8 substantially covers the dial face but has a portion cut away as at 13 to permit reading of the indicia corresponding to the rotor position. A pointer 14 is also mounted on the casing and extends over the side of the dial to cooperate with the indicia to indicate the rotor position.

In addition to passage 5, there are three other passages, 19, 20 and 21, opening into the stator seat. Passage 19 leads from the stator to a manually adjustable pilot valve of a well-known type which is accessible upon removal of cap 24. An outlet 25 at the rear of this valve is connected by means of tubing 26 to a pilot burner 27.

Passage 20 forms part of the main conduit between inlet 2 and outlet 3 and leads from the stator seat to the safety pilot valve 28. The small passage 21 leads from the discharge side of the safety valve to the stator.

The rotor disc 7 has two arcuate grooves 22 and 23 formed in the face thereof and arranged to establish different communications between the stator passages at different positions of the rotor relative to the stator. There are three operating positions for the rotor known as the "off", "start" and "run" positions. The various communications established at these positions will be explained hereinafter in discussing the operation of the device. Until then, it will be sufficient to note that these positions are reached in the order named in the normal procedure by continuous rotation in one direction of the manually operated dial 9. The passages in the rotor and stator are so arranged that the direction of rotation tends to advance the axle stem 8 into the hole in the stator. Further means are provided for preventing the dial from being turned from one position to another in the opposite direction tending to loosen the stem. This means consists of a latch member or pin 15 located beneath the pointer 14 and urged by spring 16 against the edge of the cup-shaped dial 9 which has a plurality of notches 17 and 17' formed therein. These notches are adapted to receive the member 15 at each of the operating positions to provide a friction latch for the dial. Inspection of Figs. 9 and 10 will reveal that the notches 17 are shaped with one square corner 18 so that from the "off" position, the dial may be turned only toward the "start" position, and from "start" only toward "run." From Fig. 11 it can be seen that notch 17' is so shaped that from "run" the dial may be turned to "off" or may be turned a short distance backward until member 15 engages the corner 18. The position of the rotor when the member 15 engages corner 18 is not a normal operating position but is a minor position known as "pilot only" position and is provided for reasons set forth hereinafter. The dial may not be turned from "run" to "start" without first passing the "off" position.

The shut-off cock thus provided is of decided advantage in its compactness and ease of manufacture and assembly and in its particular cooperation with the other members of the control unit.

The safety valve 28 is constantly urged toward its seat 30 by a spring 29. The seat 30 is carried on a member 31 which is threadedly mounted in the casing 1. Valve 28 has a composition insert 32 which actually engages the seat 30 and which is held in place by a retaining washer 33. Access to the valve 28 and member 31 may be gained by removing cap 34. The valve 28 is actuated by a valve stem 35 extending therefrom through a bore in member 31 to a thin, flexible sealing disk 36 which is clamped at its peripheral margin between a shoulder 38 formed in the casing and the member 31. The washer 37 serves to insure a gas-tight seal. The member 31 extends from the valve seat to the seal and is provided with radial ports 39 permitting gas passing through the valve 28 to flow therethrough to passage 40 forming part of the main conduit through the casing.

A bell-crank lever 41 is pivoted on the casing and on one end carries a button 42 engaging the sealing disk 36, the button being in line with the valve stem 35. The other end of the lever 41 is positioned to be engaged by the cam 43 carried by or formed on the edge of dial 9 to open the safety valve 28 upon rotation of the dial from "start" to "run". The cam does not engage the lever at the "start" position and it has completely passed the lever before the "run" position is reached.

A thermomagnetic assembly is employed to hold the safety valve open against the spring 29 after the cam 43 has released the lever. The assembly includes a horseshoe-shaped electromagnet 44 within a housing 45 removably mounted on the casing 1 over the flexible sealing disk 36. A rod 46, extending through the base of the magnet in line with the valve stem 35 has one end engaging the button 42 while the other end carries an armature bar 47. Bar 47 is urged toward the poles of the electromagnet 44 by a light spring 48. The spring 29, being much stronger than spring 48, tends to hold the parts in the position shown in Fig. 13.

The arms of the horseshoe-shaped electromagnet carry coils 49 of the wire 50 which extends from the housing 45 through a current carrying tube 51 to be connected with one element 53 of an electro-thermocouple. The other end of the wire is connected to the tube 51 as at 52, the tube in turn being connected to the other element 54 of the thermocouple. The outer ends of the two elements are connected at 55 and are held in position to be heated by the flame from the pilot burner 27 by a bracket 56. The heat of the pilot flame on the junction 55 will create a current in the coils 49 sufficient to energize the electromagnet 44. Therefore, when the safety valve is opened manually by means of the cam 43 and lever 41, the spring 48 will force the armature bar 47 against the magnet 44, where it will be held to retain the safety valve in open position. Upon extinguishment of the pilot flame, the junction 55 will cool and the current will cease. Whereupon the electromagnet will fail to hold the armature bar against the force of spring 29 and the safety valve will be closed.

The passage 40 leads from the safety valve 28 to the thermostatic regulating valve 57. However, a manually adjustable, restriction valve 58 is inserted in passage 40 and serves to adjust the pressure of the gas fed to the burner 4.

A spring 59 constantly urges the regulating valve 57 toward its seat 60 carried by the member 61 which is removably mounted in the casing. Access to valve 57 and member 61 may be gained by removing cap 62. The valve 57 is operated by a valve stem comprising two relatively adjustable parts 63 and 64, the latter of which engages a thin metal snap-action or clicker disk 65. The disk 65 is of a type well-known in the art and is adapted to be held near its periphery between an annular knife-edged shoulder 66 on member 61 and an annual knife-edged shoulder 67 of a slightly smaller radius carried by a thrust member 68. Movement of the thrust member back and forth along the same axis as the valve 57 results in a snap flexing of the center of the disk 65 back and forth to operate the valve. The thrust member 68 rests against a flexible sealing disk 69 and is moved by a thermally-responsive element mounted on the other side of the disk. The member 61 which carries the valve seat 50 and the shoulder 66 is provided with radial ports permitting the flow of gas from valve 57 to the outlet 3.

The thermally-responsive unit as shown is of the rod and tube type and is especially arranged to be inserted in the storage tank of a water heating system. The tube 70 of the thermo-responsive unit has a high coefficient of expansion and is securely mounted at its inner end on the casing 1. The rod 71 of the unit has a low coefficient of expansion and extends within the tube and is threadedly connected with a plug 72 anchored in the outer end of the tube 70. The inner end of the rod carries a cap 73 which engages the sealing disk 69. The differential in the expansion of the rod and tube under the influence of the heat of the water causes the rod to actuate the thrust member 68 to effect opening and closing of the valve 57. The temperature at which valve 57 will be operated may be adjusted by means of a manually operated lever 74 attached to the rod 71 by set screw 75. The lever 74 carries a handle 76 and a pointer 77 for cooperation with indicia carried on the casing. Movement of the lever up and down as shown in Fig. 1 rotates the rod 71 to screw same further in or out of plug 72 to change the expansion differential. It is to be noted that the range of adjustment is such that at the lowest position the pointer registers "off". That is, the temperature setting is such that the water cannot get cold enough to open the valve 57.

A locking lever 78 is secured at one end to the lever 74 to be movable therewith and is guided by a pin 79 in the casing 1 extending through a slot 80 in the lever 78 intermediate the ends thereof. The locking lever 78 extends from lever 74 upwardly toward the side of the cup-shaped dial 9. The lever 78 is of such a length that its upper end will clear the side of the dial only when the adjusting lever is at the lowest position mentioned above. The side of dial 9 has an elongated opening 81 in such a positon that the opening will be opposite the end of lever 78 when the dial is in "run" position. Thus, the side of the dial is in effect a stop and the adjusting lever 74 may be lifted above its lowest position only when the dial is turned to "run" position. At that time, lifting of lever 74 will raise lever 78 whose upper end enters the opening 81 and the dial may not be turned away from "run" position until the adjusting lever is re-set to its lowest point. Because of the position of lever 78 the notches 17 will not permit it to be raised so that the adjusting lever is therefore locked in its lowest position with the regulating valve closed and is released only upon rotation of the dial to "run" position. As shown in Fig. 12 the slot 80 in the locking lever 78 is so shaped that after the end of the lever enters the elongated opening 81 in the dial, it will be moved along the opening upon continued upward movement of lever 74 and thus avoid the rotor disk of the shut-off cock which is enclosed by the dial.

In installing the control the thermostatic unit is inserted into the tank through an opening provided in the tank and the threaded boss 82 screwed into the opening. However, in turning the casing to screw in the boss the tubing 51 of the thermomagnetic assembly gets in the way. The assembly is therefore removed and after the casing is mounted on the tank, the assembly is slipped in sideways between the tank and the casing and secured by screws. The button 42 is tapered to lift the rod 46 into place as the assembly is slipped in sideways.

The operation of the control is comparatively simple and provides complete safety. In the "off" position of the dial, the relative positions of the passages in the stator and rotor are as shown in Fig. 4 and no gas can pass the shut-off cock. The pilot cannot be burning, the safety valve is shut and because of the locking lever, the regulating valve is shut. Rotation of the dial to "start" places the rotor passages as shown in Fig. 5 so that gas may pass from inlet passage 5 through the small groove 23 to passage 19 to the pilot burner which should then be ignited. In the "start" position, gas also passes through groove 23 to passage 20 and the safety valve 28. However, the safety valve is still closed as is the regulating valve.

After a time interval of several seconds to permit the pilot flame to heat the thermocouple sufficiently to energize the electromagnet, the dial is rotated directly from "start" to "run". After leaving the "start" position, the cam 43 on the dial engages the bell-crank lever 41 to open the safety valve which is then held open by the magnet. Continued rotation places the groove 23 in position to connect both passages 5 and 21 to the pilot passage 19 so that gas to the pilot is supplied from both ahead and behind the safety valve at that particular instant. However, when the "run" positon is reached, the relative position of the rotor and stator is as shown in Fig. 7 and gas flows from inlet passage 5, through groove 22, passage 20 and the safety valve to passage 40. Gas also flows from the discharge side of the safety valve through passage 21, groove 23 and passage 19 to the pilot burner.

Thus, when the dial has been turned to "run" position, the shut-off cock is in full open or running position, the pilot is burning gas supplied under the control of the safety valve which is held open and will be held open by the magnet so long as the pilot is burning. Then, and then only may the adjusting lever be lifted to set the temperature at which the regulating valve will be operated. If the water is colder than the temperature so set, the regulating valve will be opened and gas will flow to the main burner to be ignited by the pilot flame. If for any reason the pilot flame is extinguished, the safety valve will be closed, shutting off all gas to both burners. Thereafter, before the dial can be turned to supply gas to the pilot and to open the safety valve, the adjusting lever must be set to its lowest or off position with the regulating valve closed.

The "pilot only" position on the dial is not intended to be used in the ordinary course of events. This position is provided between the "start" and the "run" positions to meet the requirements of the American Gas Association that means shall be provided independent of any automatic devices for controlling or shutting off the main gas supply without affecting the pilot gas supply. In the "pilot only" position, all gas is shut off by the cock except that passing from the inlet passage to the pilot and the "pilot only" position may be reached from the "run" position by turning the dial backwards.

Although in the present device there are at least two positions of the gas cock, one between "start" and "pilot only" and one between "pilot only" and "run", in which gas may flow in the main conduit through the cock at the same time that the safety valve would be prevented by a portion of the cam from closing completely, it will be understood that no gas can pass to the main burner because the regulating valve is locked in closed position. It will then be safe for the operator to attempt to relight the pilot.

In this manner is provided a compact control that is completely safe and practical. The appended claims are directed to this structure and are intended to cover all legitimate modifications and other embodiments of the disclosed invention.

I claim:

1. In a fuel control device, the combination of a manually operated shut-off cock, a safety valve and a thermally actuated valve arranged in series in a main conduit, an auxiliary conduit extending from the discharge side of the safety valve to said cock, a pilot burner having communication with the cock, said cock having passages therein arranged in one position of the cock to supply fuel to said burner independently of the other valves and in another position to open the main conduit to the safety valve and to supply fuel from the auxiliary conduit to the burner, means for opening the safety valve upon rotation of said cock from the first to the second position, means responsive to the presence of flame at the burner for holding said safety valve open, adjusting means associated with said thermally actuated valve for setting the temperature at which the same will be operated, a stop, and a member movable with said adjusting means and adapted to engage said stop to prevent moving of said adjusting means above a predetermined setting, said predetermined setting being sufficiently low to preclude opening of the thermally actuated valve, said stop being associated with said cock and arranged to avoid such engagement when the cock is in the second position.

2. In a fuel control device, the combination of a shut-off cock, a safety valve and a thermally actuated valve arranged in series in a main conduit, an auxiliary conduit extending from the discharge side of the safety valve to said cock, a pilot burner having communication with said cock, a manually rotatable dial for positioning the cock, said cock having passages therein arranged in one position thereof to supply fuel to said burner independently of the other valves and in another position to open the main conduit to the safety valve and to supply fuel from the auxiliary conduit to the burner, means for opening the safety valve upon rotation of the cock from the first to the second position, means rendered operative by the burner flame for holding the safety valve open, adjusting means associated with said thermally actuated valve for setting the temperature at which the same will be operated, and a lever movable with said adjusting means and having a portion adapted to engage said dial to lock said adjusting means in a position to preclude opening of the thermally actuated valve, said dial having an opening located to permit movement thereinto of said portion to avoid such engagement when the cock is in the second position.

3. In a fuel control device, the combination of a shut-off cock, a safety valve and a thermally actuated valve arranged in series in a main conduit, an auxiliary conduit extending from the discharge side of the safety valve to said cock, a pilot burner having communication with said cock, a manually rotatable dial for positioning the cock, said cock having passages therein arranged in one position of the cock to supply fuel to said burner independently of the other valves and in another position to open the main conduit to the safety valve and to supply fuel from the auxiliary conduit to the burner, a lever connected with said safety valve, a cam carried by said dial and operatively connected with said lever to effect opening of the safety valve upon rotation of the cock from the first to the second position, means rendered operative by the burner flame for holding said safety valve open, adjusting means associated with said thermally actuated valve for setting the temperature at which the same will be operated, and a member movable with said adjusting means and adapted to engage a portion of said dial to lock said adjusting means in a position to preclude opening of said thermally actuated valve, said dial being shaped to avoid such engagement when the cock is in the second position.

4. In a fuel control device, a casing having a main conduit therethrough, a cock and a safety valve therein, a manually rotatable dial for operating the cock having off, starting and running positions, a pin mounted on the casing, a spring for constantly urging said pin against the dial, said dial having a plurality of notches therein located to receive said pin in a notch at each of said positions to provide a friction latch for the dial, a lever connected to said safety valve, a cam carried by said dial and arranged to engage said lever to effect opening of the safety valve upon rotation of the dial from starting to running position, means rendered operative by the pilot flame for holding said safety valve open, a thermostatically operated valve in said conduit, adjusting means for setting the temperature at which the thermostatic valve will be operated, and a member movable with said adjusting means into cooperative relation with the dial to prevent opening of the thermostatic valve except when the cock is in running position and to prevent closing of the cock when the thermostatic valve is open.

5. In a fuel control device, a casing, a regulating valve therein, a thermo-responsive means including a tube having its inner end fixedly mounted on the casing and a rod within the tube threadedly connected with the outer end thereof and operatively connected with said valve, said tube and rod having different coefficients of expansion whereby to effect actuation of said valve, a lever connected to and projecting radially from said rod for turning same relative to the tube to set the temperature at which said valve will be operated, a shut-off cock having a series of rotary positions including a final running position, a manually rotatable dial for operating said cock, a second lever secured to and movable with the first lever and adapted to engage a portion of said dial to prevent movement of said member above a predetermined setting, said setting being sufficiently low to preclude opening of said valve, said dial portion being shaped to permit movement of said member above the predetermined setting only when the cock is in the running position.

6. A fuel control device comprising a fuel conduit, a manually operable shut-off valve, a safety valve and a thermostatic regulating valve arranged in series in said conduit, adjusting means for setting the temperature at which the regulating valve will be thermostatically operated, an operative connection between the shut-off valve and the safety valve for opening the safety valve upon movement of the shut-off valve from closed to running position, and means interposed between said shut-off valve and the temperature setting means of the regulating valve for preventing a low temperature setting of the regulating valve except when the shut-off valve is in running position and for preventing closing of the shut-off valve except when a high temperature setting of the regulating valve has been effected.

7. A fuel control device comprising a fuel conduit, a manually operable shut-off valve, a safety valve and a thermostatic regulating valve arranged in series in said conduit, adjusting means for setting the temperature at which the regulating valve will be thermostatically actuated, a knob for operating the shut-off valve, said knob being provided with a cam, a lever interposed between said knob and the safety valve, whereby the safety valve is opened by the cam upon movement of the shut-off valve from closed to running position, and means including a slot formed in said knob and a lever connected with said regulating valve adjusting means for preventing a low temperature setting of the regulating valve when the shut-off valve is not in running position and for preventing movement of the shut-off valve from running position when said adjusting means is disposed in a high temperature setting position.

8. In a fuel control device, a casing a regulating valve therein, a thermostat for operating said valve, adjusting means connected with said thermostat for setting the temperature at which the valve will be operated, a shut-off valve movable to a plurality of positions including a final running position, a lever connected to and movable with said adjusting means, and means movable with the shut-off valve across the path of said lever to lock said adjusting means in a position to preclude opening of the regulating valve, said locking means being inoperative to restrain said lever when the shut-off valve is turned to the running position, thereby permitting a temperature change setting of the regulating valve when the shut-off valve is in running position.

9. In a fuel control device, a casing, a regulating valve therein, a thermostat for operating said valve, adjusting means connected with said thermostat for setting the temperature at which the valve will be operated, a shut-off cock having a series of positions including a fully open final running position, a manually rotatable knob for operating said cock, a member connected to and movable with said adjusting means and having a portion adapted to engage said knob to lock said adjusting means in a position to preclude opening of the valve when the cock is not in final running position, said knob having an opening arranged to receive said portion when the cock is turned to the running position, thereby permitting thermostat setting and simultaneous locking of the knob against rotation.

WILBUR F. JaCKSON.